US012709547B2

(12) United States Patent
LaMar et al.

(10) Patent No.: US 12,709,547 B2
(45) Date of Patent: Aug. 18, 2026

(54) PRODUCTION OF CALCIUM CARBONATE VIA SOLID-STATE CALCIUM HYDROXIDE PARTICLES AND CARBON DIOXIDE, AND ASSOCIATED SYSTEMS AND METHODS

(71) Applicant: Graymont (PA) Inc., Pleasant Gap, PA (US)

(72) Inventors: Brent LaMar, Seattle, WA (US); Jared Ira Leikam, West Jordan, UT (US); Joseph Lewis, Stansbury Park, UT (US)

(73) Assignee: GRAYMONT (PA) INC., Pleasant Gap, PA (US)

( * ) Notice: Subject to any disclaimer, the term of this patent is extended or adjusted under 35 U.S.C. 154(b) by 216 days.

(21) Appl. No.: 18/340,783

(22) Filed: Jun. 23, 2023

(65) Prior Publication Data

US 2023/0357036 A1 Nov. 9, 2023

Related U.S. Application Data

(60) Continuation of application No. 17/094,871, filed on Nov. 11, 2020, now abandoned, which is a division of application No. 16/572,896, filed on Sep. 17, 2019, now Pat. No. 10,870,585.

(60) Provisional application No. 62/732,427, filed on Sep. 17, 2018.

(51) Int. Cl.
*C01F 11/18* (2006.01)
*B01J 19/00* (2006.01)

(52) U.S. Cl.
CPC .......... *C01F 11/18* (2013.01); *B01J 19/0053* (2013.01)

(58) Field of Classification Search
CPC ........ B01J 19/00; B01J 19/0053; C01F 11/00; C01F 11/18; C01P 2006/00; C01P 2006/80; C01P 2006/82
See application file for complete search history.

(56) References Cited

U.S. PATENT DOCUMENTS 2,581,719 A * 1/1952 Schoenlaub .............. C01F 5/24 423/160
6,322,769 B1 11/2001 Langelin et al.
9,963,386 B1 * 5/2018 Griffard .................. C04B 2/045
(Continued)

OTHER PUBLICATIONS

Brunauer, et al., "Adsorption of Gases in Multimolecular Layers", Contribution from the Bureau of Chemistry and Soils and George University, Feb. 1938, 309-319.
(Continued)

*Primary Examiner* — Natasha E Young
(74) *Attorney, Agent, or Firm* — Ashurst Perkins Coie US LLP; Vijay S. Kumar

(57) ABSTRACT

Methods and systems for producing calcium carbonate from calcium hydroxide and carbon dioxide are disclosed herein. In some embodiments, a method for producing calcium carbonate comprises (i) providing a first plurality of particles comprising solid-state calcium hydroxide, and (ii) introducing a gas stream comprising carbon dioxide to the first plurality of particles to produce a second plurality of particles comprising calcium carbonate. Individual ones of the first plurality of particles can include a specific surface area of at least 20 $m^2/g$ and a free moisture content of from 2% to 20%. The second plurality of particles comprising calcium carbonate are not produced via precipitation.

19 Claims, 2 Drawing Sheets

(56) References Cited

U.S. PATENT DOCUMENTS

| | | | | |
|---|---|---|---|---|
| 10,369,518 | B2 | 8/2019 | Tate et al. | |
| 10,870,585 | B2 | 12/2020 | Lamar et al. | |
| 2009/0028774 | A1 * | 1/2009 | Matsushita | C01F 11/181 423/432 |
| 2012/0189515 | A1 | 7/2012 | Jensen et al. | |
| 2015/0210559 | A1 | 7/2015 | Skrzypczak et al. | |
| 2017/0240432 | A1 | 8/2017 | Jung et al. | |
| 2017/0355610 | A1 | 12/2017 | Maurer et al. | |
| 2018/0237300 | A1 | 8/2018 | Sakai et al. | |

OTHER PUBLICATIONS

International Search Report and Written Opinion dated Jan. 3, 2020, International Application No. PCT/US2019/051504; 8 pages.

Office Action issued for Canadian Patent Application No. 3,113,078 dated Oct. 5, 2023, 6 pages.

Office Action issued for Canadian Patent Application No. 3,113,078, dated Aug. 28, 2024, 5 pages.

Office Action issued for Canadian Patent Application No. 3,113,078 dated Apr. 4, 2025, 4 pages.

* cited by examiner

PRODUCTION OF CALCIUM CARBONATE VIA SOLID-STATE CALCIUM HYDROXIDE PARTICLES AND CARBON DIOXIDE, AND ASSOCIATED SYSTEMS AND METHODS

CROSS-REFERENCE TO RELATED APPLICATION(S)

The present application is a continuation of U.S. patent application Ser. No. 17/094,871, filed Nov. 11, 2020, which is a divisional of U.S. patent application Ser. No. 16/572,896, filed Sep. 17, 2019, now U.S. Pat. No. 10,870,585, which claims the benefit of priority to U.S. Provisional Patent Application No. 62/732,427, filed Sep. 17, 2018, the disclosures of which are incorporated herein by reference in their entireties.

TECHNICAL FIELD

The present disclosure relates generally to the production of calcium carbonate via solid-state calcium hydroxide particles and carbon dioxide, and associated systems and methods.

BACKGROUND

Calcium carbonate is used extensively in the papermaking and paint industries, and for manufacturing of plastic materials, sealing compounds, printing inks, rubbers and cosmetics, amongst other applications. In these industries, the calcium carbonate is often used as a filler component or coating pigment to increase brightness characteristics of the material or product the calcium carbonate is embedded in. Calcium carbonate has conventionally been produced via precipitation, for example, by introducing carbon dioxide into a lime slurry, sometimes referred to as the "milk of lime." Carbonation of the milk produces an aqueous solution made up of water and precipitated calcium carbonate (PCC). Once produced, the aqueous solution is then dried to extract the PCC, which makes up about 30% of the aqueous solution.

One drawback of the above-described, conventional method of producing calcium carbonate is the time and expense associated with drying the aqueous solution to extract the PCC. Because the calcium carbonate makes up only about 30% of the aqueous solution, significant energy is needed to dry the aqueous solution and extract the calcium carbonate formed via precipitation. Furthermore, facility equipment and personnel needed to perform the operation of creating and drying the PCC solution result in additional time, cost and resources. Accordingly, there exists a need for improved systems and methods for producing calcium carbonate particles.

BRIEF DESCRIPTION OF THE DRAWINGS

Many aspects of the present disclosure can be better understood with reference to the following figures. The components in the figures are schematic and thus are not to scale. Instead, emphasis is placed on illustrating clearly the principles of the present disclosure.

DETAILED DESCRIPTION

I. Overview

Figure 1:
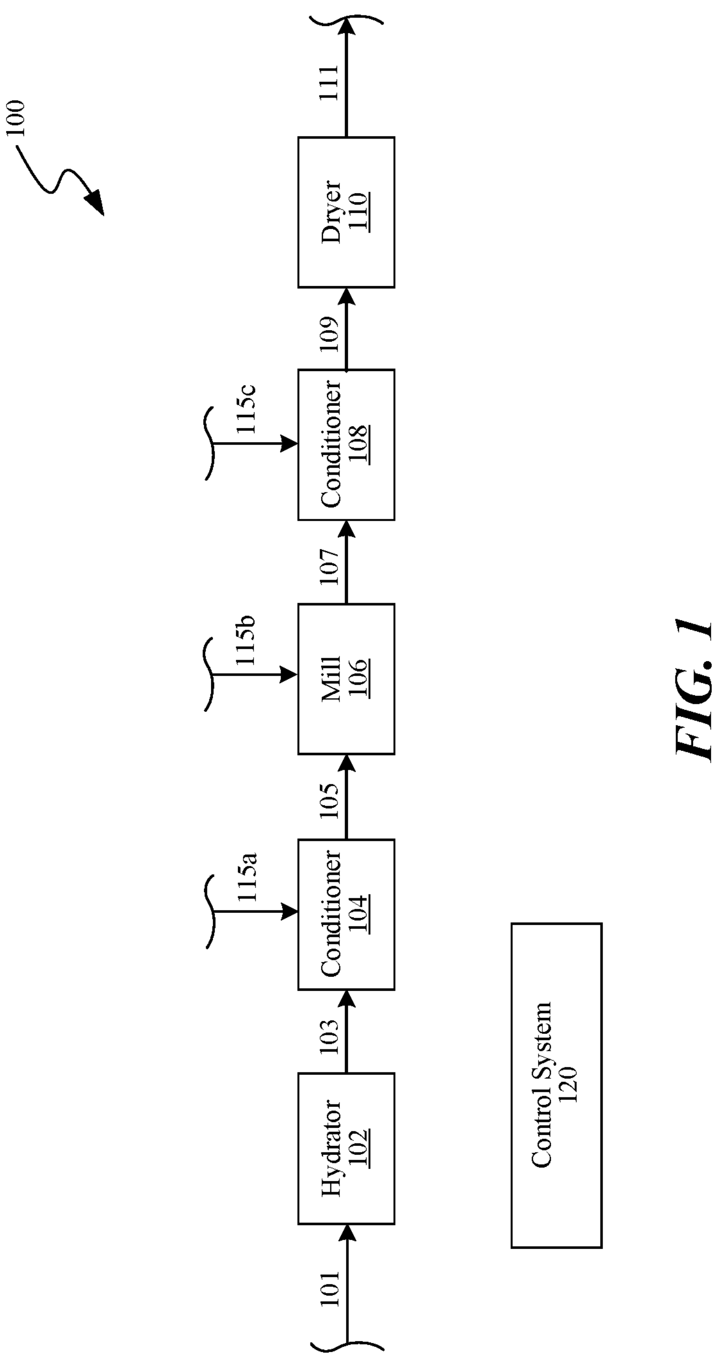
FIG. 1 is a schematic block diagram of a system for producing calcium carbonate, in accordance with embodiments of the present disclosure.

The present disclosure described herein relates to improvements over conventional methods of producing calcium carbonate. As previously described, these conventional methods produce calcium carbonate via precipitation by forming an aqueous solution or slurry that contains precipitated calcium carbonate (PCC). This aqueous solution must be dried to isolate the PCC from the rest of the solution before conducting further processing (e.g., grinding) to produce a calcium carbonate product. Such production methods are inefficient due to the energy needed to dry the aqueous solution, and can create issues relating to inadequate brightness characteristics of the extracted calcium carbonate, as described elsewhere herein.

Embodiments of the present disclosure address at least some of the issues associated with the conventional methods of producing calcium carbonate. As described in additional detail below, embodiments of the present disclosure produce calcium carbonate via methods other than precipitating calcium carbonate via a liquid slurry or aqueous solution. For example, in some embodiments a first plurality of particles comprising solid-state calcium hydroxide (e.g., enhanced hydrated lime) is provided, and a gas stream comprising carbon dioxide is introduced to directly contact the calcium hydroxide and produce solid-state particles comprising calcium carbonate. The solid-state calcium hydroxide used to produce the calcium carbonate particles can have particular characteristics to aid conversion of calcium hydroxide to calcium carbonate. As described in detail elsewhere herein, the calcium hydroxide particles can have a specific surface area of at least about 20 $m^2/g$, a free moisture content of from about 2% to 20%, a pore volume of at least about 0.1 $cm^3/g$, and/or an average pore size diameter of at least about 100 angstroms. In some embodiments, the produced particles can then be milled, dried, and further exposed to additional gas streams comprising carbon dioxide (e.g., iteratively milled, dried and exposed to carbon dioxide), e.g., until a desired composition and/or conversion of calcium carbonate is achieved. The produced calcium carbonate can have a Technical Association of Pulp and Paper Industry (TAPPI) brightness at or above a predetermined threshold (e.g., 80, 85, 90, 91. 92, 93, 94, 95, 96, 97, 98, or 99).

It will be readily understood that the embodiments of the present disclosure described herein are exemplary. The following detailed description of various embodiments is not intended to limit the scope of the present disclosure, but is merely representative of various embodiments. It will be appreciated that various features are sometimes grouped together in a single embodiment or description thereof for the purpose of streamlining the disclosure. Many of these features may be used alone and/or in combination with one another. Moreover, the order of the steps or actions of the methods disclosed herein may be changed by those skilled in the art without departing from the scope of the present disclosure. In other words, unless a specific order of steps or actions is required for proper operation of the embodiments, the order or use of specific steps or actions may be modified. Furthermore, sub-routines or only a portion of a method described herein may be a separate method within the scope of this disclosure. Stated otherwise, some methods may include only a portion of the steps described in a more detailed method.

Many of the details and other features shown in the Figures are merely illustrative of particular embodiments of the disclosed technology. Accordingly, other embodiments can have other details and features without departing from the spirit or scope of the disclosure. In addition, those of ordinary skill in the art will appreciate that further embodiments of the various disclosed technologies can be practiced without several of the details described below.

II. Production of Calcium Carbonate Via Solid-State Calcium Hydroxide Particles and Carbon Dioxide FIG. 1 is a schematic block diagram of a system 100 for producing calcium carbonate ($CaCO_3$), in accordance with embodiments of the present disclosure. As shown in FIG. 1, the system 100 can include a hydrator 102 configured or positioned to receive a first plurality of particles 101 comprising quicklime (e.g., calcium oxide (CaO)), and produce a second plurality of particles 103 comprising hydrated lime (e.g., calcium hydroxide ($Ca(OH)_2$). The second plurality of particles 103 can include at least about 90% or 95% by weight calcium hydroxide. The second plurality of particles 103 can include particles that have not been dried. In some embodiments, the hydrator 102 can include a feeder configured to receive the first plurality of particles 101, and a slaker or other hydration device configured to combine water with the first plurality of particles 101, e.g., to convert calcium oxide of the first plurality of particles 101 into a water suspension or slurry of calcium hydroxide. As discussed elsewhere herein, in some embodiments the feeder can control the feed rate of particles to the slaker, such that the moisture content of the produced calcium hydroxide of the second plurality of particles 103 is at or above a predetermined threshold. In some embodiments, water is added to the quicklime of the first plurality of particles 101 such that the calcium hydroxide particles of the second plurality of particles 103 have a residual or free moisture content of at least about 1%, 2%, 3%, 5%, 6%, 7%, 8%, 9%, 10%, 11%, 12%, 13%, 14% 15%, 16%, 17%, 18%, 19%, 20%, or any value or range of values between 1% and 20% by weight.

In some embodiments, the quicklime of the first plurality of particles 101 may be slaked via the hydrator in the presence of one or more additives (e.g., ethylene glycol, diethylene glycol, triethylene glycol, monoethanolamine, diethanolamine, triethanolamine, sodium or calcium lignosulfonate, and/or combinations thereof). Without being bound by theory, using one or more of these additives may inhibit "clumping" or the formation of relatively large calcium hydroxide aggregates. Stated differently, the additive(s) may result in an improved particle size distribution of the second plurality of particles 103. Additionally or alternatively, the additive(s) can also be added to the second plurality of particles 103 (e.g., downstream of the hydrator 102), e.g., to help negate a charge associated with the calcium hydroxide particles. The additive(s) may also be incorporated into the system 100 at other stages of manufacturing (e.g., before, during, and/or after milling). In some embodiments, the additive(s) are present in the quicklime/water mixture within the hydrator 102 at a concentration of from about 0.1% and 1.5% by weight of added water. In some embodiments, no additive is used.

As described elsewhere herein, calcium carbonate is conventionally produced via precipitation by injecting carbon dioxide into a liquid lime slurry to form PCC. The aqueous or liquid characteristics of the slurry contribute to a relatively high conversion rate of the calcium hydroxide and production of calcium carbonate. Some embodiments of the present disclosure do not produce calcium carbonate via precipitation by injecting carbon dioxide into a liquid lime slurry, but rather expose carbon dioxide to calcium hydroxide particles in a solid-state. The solid-state characteristics of the calcium hydroxide particles, relative to the aqueous PCC solution, naturally result in less exposure time between the carbon dioxide and the individual calcium hydroxide particles. To increase exposure of the calcium hydroxide particles to the carbon dioxide, the system 100 of the present technology utilizes calcium hydroxide particles with contact-enhancing characteristics, e.g., relative to more traditional lime hydrate particles. As explained elsewhere herein, the individual calcium hydroxide particles of the second plurality of particles 103 can have certain characteristics, such as specific surface area, moisture content (e.g., a free moisture content), porosity (e.g., pore size and/or pore volume), particle size, particle size distribution, carbon dioxide content, and/or combinations thereof, that are configured to increase the interactions between the carbon dioxide molecules and calcium hydroxide particles. For example, in some embodiments individual ones of the second plurality of particles 103 can include a specific surface area of at least 15 $m^2/g$, 20 $m^2/g$, 25 $m^2/g$, 30 $m^2/g$, 35 $m^2/g$, 40 $m^2/g$, 45 $m^2/g$, 50 $m^2/g$, or any value or range of values between 15 $m^2/g$ and 50 $m^2/g$. The specific surface area can be measured by equipment that uses gas sorption techniques described in "Adsorption of Gases in Multimolecular Layers" by Braunauer, Emmett, and Teller. Additionally or alternatively, individual ones of the second plurality of particles 103 can include a moisture content of no greater than about 20%, 19%, 18%, 17%, 16%, 15%, 14%, 13%, 12%, 11%, 10%, 9%, 8%, 7%, 6%, 5%, 4%, 3%, 2%, or 1%, or any value or range of values between 1% and 20%. Additionally or alternatively, individual ones of the second plurality of particles 103 can include a pore volume of at least about 0.1 $cm^3/g$, 0.15 $cm^3/g$, 0.2 $cm^3/g$, 0.25 $cm^3/g$, 0.3 $cm^3/g$, 0.35 $cm^3/g$, 0.4 $cm^3/g$, or any value or range of values between 0.1 $cm^3/g$ and 0.4 $cm^3/g$. Additionally or alternatively, individual ones of the second plurality of particles 103 can include pores having openings of at least about 100 angstroms, 150 angstroms, 200 angstroms, 250 angstroms, 300 angstroms, 350 angstroms, 400 angstroms, of any value or range of values between 100 angstroms and 400 angstroms. Additionally or alternatively, individual ones of the second plurality of particles 103 can include a carbon dioxide content by weight of less than about 4%, 3%, 2%, 1%, or any value or range of values between 1% and 4%. Each of these characteristics may contribute to an increased production and/or conversion of calcium carbonate.

In some embodiments, the second plurality of particles 103 can include a particular particle size distribution. For example, the ratio of the minimum diameter and maximum diameter of the second plurality of particles can be greater than about 80%, 85%, 90%, 95%, or any value or range of values between 80% and 95%. Additionally or alternatively, a $D_{10}$ value of the second plurality of particles can be (i) less than about 4.0 microns, or (ii) within a range of from about 0.5 microns to 4.0 microns, or any value or range of values between 0.5 microns and 4.0 microns. Additionally or alternatively, a $D_{90}$ value of the second plurality of particles 103 can be (i) less than about 50 microns, or (ii) within a range of from about 15 microns to 50 microns, or any value or range of values between 15 microns and 50 microns. Additionally or alternatively, the ratio of $D_{90}$ to $D_{10}$ (i.e., the "steepness") of the second plurality of particles 103 can be (i) no greater than 25, 20, 15, 10, or 8, or (ii) within a range of from about 8 to 25, or any value or range of values between 8 and 25. For purposes of this disclosure, the $D_X$ value of a sample of particles is the diameter at which X % of the sample is of particles having a diameter below the specified value. For example, the $D_{10}$ value of a sample of particles is the diameter at which 10% of the sample's volume is from particles that have a diameter that is less than the $D_{10}$ value. Similarly, the $D_{90}$ value of a sample of particles is the diameter at which 90% of the sample's volume is from particles that have a diameter that is less than the $D_{90}$ value. Additional details regarding the composition, characteristics, parameters, and other features associated with the calcium hydroxide are described in U.S. patent application Ser. No. 15/922,179, now U.S. Pat. No. 10,369,518, filed Mar. 15, 2018, the disclosure of which is incorporated herein by reference in its entirety.

As described elsewhere herein, the composition and characteristics of the calcium hydroxide of the second plurality of particles 103 can enable greater production of calcium carbonate relative to utilizing calcium hydroxide without these characteristics (e.g., traditional lime hydrate). For example, the specific surface area and/or pore volume of the individual calcium hydroxide particles of embodiments of the present disclosure are generally greater than those of traditional lime hydrate. As such, the specific surface area and/or pore volume of individual calcium hydroxide particles of embodiments of the present disclosure are able to absorb more carbon dioxide, thereby aiding the production of calcium carbonate. As another example, the larger pore size of individual calcium hydroxide particles of embodiments of the present disclosure also aids the production of calcium carbonate. For example, without being bound by theory, the larger pore size can allow the carbon dioxide molecules to travel at least partially through the pores of the calcium hydroxide particles. This is in contrast to conventional methods in which the carbon dioxide molecules engulf entire calcium hydroxide particles, which may result in a "shelled" effect and lower calcium carbonate production rates.

As shown in FIG. 1, the system 100 can further include a conditioner 104 configured or positioned to (i) receive the second plurality of particles 103, and a fluid 115*a* (e.g., a gas stream) comprising carbon dioxide, and (ii) produce a third plurality of particles 105 comprising calcium carbonate via Reaction 1.

$$Ca(OH)_2(s)+CO_2(g)\rightarrow CaCO_3(s)+H_2O(l) \quad \text{(Reaction 1)}$$

The fluid 115*a* can be injected into the conditioner 104 such that the carbon dioxide of the fluid 115*a* directly contacts at least a portion of the second plurality of particles 103. The fluid 115*a* can include off-gas from a combustion process or be at least partially sourced from an off-gas stream. For example, the fluid 115*a* may be sourced from a combustion process associated with a lime kiln. Additionally or alternatively, the fluid 115*a* can be at least partially sourced from a pure carbon dioxide source (e.g., a liquid carbon dioxide tank). In such embodiments, the pure carbon dioxide source may be blended with the off-gas. The carbon dioxide composition of the fluid 115*a* can be at or above a predetermined threshold (e.g., about 30%, 40%, 50%, 60%, 65%, 70%, 75%, 80%, 85%, 90%, 95%, 98%, 99%, or any value or range of values between 30% and 99%).

The conditioner 104 can include a pressure vessel or container having one or more injection or input points for receiving the fluid 115*a* and exposing it to the second plurality of particles 103. In some embodiments, the conditioner 104 is configured to withstand pressures of at least about 50 kilopascals (kPa), 100 kPa, 200 kPa, 400 kPa, 500 kPa, 750 kPa, 1 megapascal (MPa), 2 MPa, 3 MPa, or any value or range of values between 50 kPa and 3 MPa. Without being bound by theory, a relatively higher pressure can increase the production and/or conversion percentage of calcium carbonate by increasing exposure of the calcium hydroxide, carbon dioxide, and/or water compounds to one another. For example, a relatively higher pressure can enable the carbon dioxide to further penetrate the calcium hydroxide and/or maintain water molecules in the liquid phase. Additionally or alternatively, in some embodiments the conditioner 104 is configured to withstand temperatures of at least about 50° C., 60° C., 70° C., or 80° C., or any value or range of values between 50° C. and 80° C. The conditioner 104 can include one or more mixing areas, mixing devices, augers, and/or paddles (e.g., rotating paddles configured to rotate in opposite directions). The conditioner 104 can be configured to increase exposure time, e.g., relative to in-line mixing, between the carbon dioxide of the fluid 115*a* and individual calcium hydroxide particles of the second plurality of particles 103, e.g., to increase the production of calcium carbonate.

In some embodiments, the second plurality of particles 103 can be exposed to the carbon dioxide of the fluid 115*a* for a period of time of at least about 5 minutes, 10 minutes, 15 minutes, 30 minutes, 60 minutes, or any value or range of values between 5 minutes and 60 minutes. Without being bound by theory, increasing the exposure time of the calcium hydroxide to the carbon dioxide can improve conversion percentage and/or production of calcium carbonate. For purposes of this disclosure, "conversion" refers to the percentage of calcium carbonate particles present in the produced plurality of particles.

The third plurality of particles 105 can include a combination of calcium carbonate particles and unreacted calcium hydroxide particles. In some embodiments, the composition of the third plurality of particles 105 can include at least about 40%, 50%, 60%, 70%, 80%, 90%, or any value or range of values between 40% and 90%, calcium carbonate by weight. Additionally or alternatively, in some embodiments, the composition of the third plurality of particles 105 can include less than 60%, 50%, 40%, 30%, 20%, 10%, or any value or range of values between 10% and 60%, calcium hydroxide by weight.

As shown in FIG. 1, the system 100 can further include a grinder 106 configured or positioned to (i) receive the third plurality of particles 105, and a fluid 115*b* comprising carbon dioxide, and (ii) produce a fourth plurality of particles 107 comprising calcium carbonate. The fluid 115*b* can be similar or identical to the fluid 115*a* described elsewhere herein, and can be sourced from the same or a different location than the fluid 115*a*. The grinder 106 can include a mill (e.g., a grinding mill, an impact mill, attritor cell mill, etc.) or other device(s) configured to break particles into smaller particles via grinding or crushing. Breaking the third plurality of particles 105 into smaller particles can expose additional surface area of the third plurality of particles 105, and thereby aid in calcium carbonate production and/or conversion. The grinder 106 can be configured such that the produced fourth plurality of particles 107 has one or more desired characteristics (e.g., steepness, particle size distribution, etc.). For example, the steepness of the fourth plurality of particles 105 may directly correlate to time spent in the grinder 106 (e.g., residence time) and may decrease as a result of grinding, thereby creating a more uniform particle size. The grinder 106 can include one or more air classification units, e.g., to increase exposure of the carbon dioxide from the fluid 115*b* to individual calcium hydroxide particles of the third plurality of particles 105 in the grinder 106. In some embodiments, carbon dioxide is exposed to the third plurality of particles 105 as they are being grinded via the grinder 106.

The fourth plurality of particles 107 can include a combination of calcium carbonate particles and unreacted calcium hydroxide particles. Generally speaking, the composition of the fourth plurality of particles 107 can include a higher concentration of calcium carbonate particles and a lower concentration of calcium hydroxide particles than that of the third plurality of particles 105. In some embodiments, the composition of the fourth plurality of particles 107 can include at least about 60%, 70%, 80%, 90%, 95%, 96%, 97%, 98%, 99% or any value or range of values between 60% and 99%, calcium carbonate by weight. Additionally or alternatively, in some embodiments, the composition of the fourth plurality of particles 105 can include less than 40%, 30%, 20%, 10%, or any value or range of values between 10% and 40%, calcium hydroxide by weight.

As shown in FIG. 1, the system 100 can further include a conditioner 108 configured or positioned to (i) receive the fourth plurality of particles 107, and a fluid 115*c* comprising carbon dioxide, and (ii) produce a fifth plurality of particles 109 comprising calcium carbonate. The fluid 115*c* can be similar or identical to one or both of the fluids 115*a*, 115*b* described elsewhere herein, and can be sourced from the same or a different location than one or both of the fluids 115*a*, 115*b*. The conditioner 108 can include similar or identical features to the conditioner 104 described elsewhere herein. In some embodiments, the conditioners 104, 108 may be a single unit. For example, in such embodiments the single unit conditioner may have multiple stages (e.g., first, second, third or more stages) in which the second plurality of particles 103 is received by a first stage of the conditioner and the fourth plurality of particles 107 is received by a second stage of the conditioner.

The fifth plurality of particles 109 can include a combination of calcium carbonate particles and, in some embodiments, unreacted calcium hydroxide particles. Generally speaking, the composition of the fifth plurality of particles 107 can include a higher concentration of calcium carbonate particles and a lower concentration of calcium hydroxide particles than that of the fourth plurality of particles 107. In some embodiments, the composition of the fifth plurality of particles 109 can include at least about 80%, 90%, 95%, 96%, 97%, 98%, 99% or any value or range of values between 80% and 99%, calcium carbonate by weight. Additionally or alternatively, in some embodiments, the composition of the fifth plurality of particles 109 can include less than 10% or 5% calcium hydroxide by weight.

As shown in FIG. 1, the system 100 can further include a dryer 110 configured or positioned to receive the fifth plurality of particles 109 and produce a sixth plurality of particles 111 comprising calcium carbonate. The dryer 110 can include a heater or other device configured to reduce the moisture content of the fifth plurality of particles 109 via direct or indirect heat. For example, the fifth plurality of particles 109 may be indirectly heated with a heated gas, such as atmospheric air, that has a temperature of between about 150° C. and 425° C., or any value or range of values between 150° C. and about 425° C. In some embodiments, the dryer 110 and grinder 106 can be a single unit such that grinding and drying of the particles occurs simultaneously.

The sixth plurality of particles 111 (e.g., a product stream) can include calcium carbonate. Generally speaking, the composition of the sixth plurality of particles 111 can include a higher concentration of calcium carbonate particles and/or a lower concentration of calcium hydroxide particles than that of the fifth plurality of particles 109. In some embodiments, the composition of the sixth plurality of particles 111 can include at least about 90%, 95%, 96%, 97%, 98%, 99% or any value or range of values between 90% and 99%, calcium carbonate by weight. Additionally or alternatively, in some embodiments, the composition of the sixth plurality of particles 111 can include less than 5% calcium hydroxide by weight. In some embodiments, the produced calcium carbonate of the sixth plurality of particles can include a TAPPI brightness above a predetermined threshold (e.g., 80, 85, 90, 91. 92, 93, 94, 95, 96, 97, 98, or 99).

The sixth plurality of particles 111 can be provided to other processes or systems for further downstream processing or quality testing. For example, the sixth plurality of particles 111 may be sieved, filtered or otherwise modified (e.g., via an air classifier or a cyclone) prior to being directed to a finished product bin for distribution. In some embodiments, the particles are sieved through a mesh having a pore size of about 600 microns, 300 microns, 150 microns, 75 microns, 45 microns, or 32 microns, or any value or range of values between 32 microns and 600 microns. In some embodiments, the sixth plurality of particles 111 are not sieved.

In some embodiments, the sixth plurality of particles 111 may be measured, e.g., to determine conversion percentage, or a percent composition of calcium carbonate and/or calcium hydroxide. For example, depending on whether the conversion and/or composition exceeds a predetermined threshold, the sixth plurality of particles 111 may be directed as product to shipping containers, or re-routed (e.g., recycled) to for further processing (e.g., milling, drying, and/or exposing calcium hydroxide to further carbon dioxide) to increase conversion or composition of calcium carbonate.

As shown in FIG. 1, the system 100 can further include a control system 120 to control operations associated with the system 100. Many embodiments of the control system 120 and/or technology described below may take the form of computer-executable instructions, including routines executed by a programmable computer. The control system 120 may, for example, also include a combination of supervisory control and data acquisition (SCADA) systems, distributed control systems (DCS), programmable logic controllers (PLC), control devices, and processors configured to process computer-executable instructions. Those skilled in the relevant art will appreciate that the technology can be practiced on computer systems other than those described herein. The technology can be embodied in a special-purpose computer or data processor that is specifically programmed, configured or constructed to perform one or more of the computer-executable instructions described below. Accordingly, the term "control system" as generally used herein refers to any data processor. Information handled by the control system 120 can be presented at any suitable display medium, including a CRT display or LCD.

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Data structures and transmissions of data particular to aspects of the technology are also encompassed within the scope of particular embodiments of the disclosed technology.

The system 100 may be operated as a batch process or a steady-state process. Additionally, the system 100 may include other processes similar to those previously described that are utilized in series or in parallel to the system 100 illustrated in FIG. 1.

Embodiments of the present disclosure have multiple advantages over conventional methods of producing calcium carbonate. For example, one advantage of at least some embodiments of the present disclosure is the ability to produce a brighter calcium carbonate product that is not dependent, or less dependent, on the raw stone material used to produce the calcium carbonate. Generally, the brightness of calcium carbonate product is a desirable characteristic, as it allows the calcium carbonate to be used in more applications and allows manufacturers to obtain higher profit margins. When using conventional methods to produce calcium carbonate (e.g., by producing PCC), brightness characteristics are largely based on the raw stone material that is used, with high bright stone (e.g., lighter-colored) material resulting in a calcium carbonate product with higher brightness, and low bright stone (e.g., darker-colored) material resulting in a calcium carbonate product with lower brightness. High bright stone is sourced from fewer geographic locations around the world relative to the available locations to source low bright stone. As such, customers or applications that need higher brightness calcium carbonate but who operate far away from these geographic locations with high bright stone material, often need to pay higher distribution costs for the brighter calcium carbonate product to be shipped longer distances.

At least some embodiments of the present disclosure alleviate this issue because they allow calcium carbonate product to be produced from stone material that does not necessarily have high brightness. Stated differently, embodiments of the present disclosure can produce calcium carbonate particles having high brightness characteristics from what are traditionally considered to be the low bright stone (e.g., darker-colored) material. This ability to produce higher brightness characteristics from low bright stone is due in part to the enhanced hydrate particles that are formed from calcium oxide particles, which are formed from the raw stone material. The raw stone material undergoes a calcination process whereby chemically-bound carbon dioxide of the raw stone material is removed from the stone, thereby producing calcium oxide having generally the same or enhanced brightness characteristics. As the calcium oxide is then slaked to form the calcium hydroxide particles, these brightness characteristics are maintained in the calcium hydroxide particles, which are then exposed to carbon dioxide to form the calcium carbonate product, as described elsewhere herein. Through this process, the brightness characteristics of the calcium oxide particles is at least maintained or enhanced, thereby producing a calcium carbonate product with greater brightness characteristics. As a result, embodiments of the present disclosure are able to produce calcium carbonate product having higher brightness characteristics in more geographic locations and at lower costs, relative to conventional methods.

Another advantage of at least some embodiments of the present disclosure is the avoidance of creating a liquid slurry of PCC, which can thereby reduce the time and expense associated with having to first produce the liquid slurry and then dry the liquid slurry to extract the precipitated calcium carbonate. As described elsewhere herein, the present disclosure instead produces calcium carbonate via methods other than precipitation, for example by exposing carbon dioxide to solid-state calcium hydroxide particles having improved characteristics (e.g., specific surfaces areas, moisture content, pore volumes, pore diameters, etc.) relative to conventional lime hydrate particles.

Yet another advantage of at least some embodiments of the present disclosure is the ability to reduce the amount of carbon dioxide released to the atmosphere. Lime kiln, cement, power and other industrial facilities use combustion firing to heat their process gas and/or other streams, and as a result generate combustion off-gas streams having substantial amounts of carbon dioxide. In at least some of these industrial processes, these gas streams comprising carbon dioxide are vented to the atmosphere which can result in an expense for the facility, since carbon dioxide is considered a green-house gas and is regulated by local and national agencies. Embodiments of the present disclosure enable these facilities to utilize at least a portion of these off-gas streams in a way that can produce additional revenue.

Figure 2:
FIG. 2 is a flow diagram of a method for producing calcium carbonate, in accordance with embodiments of the present disclosure.
Figure 2:
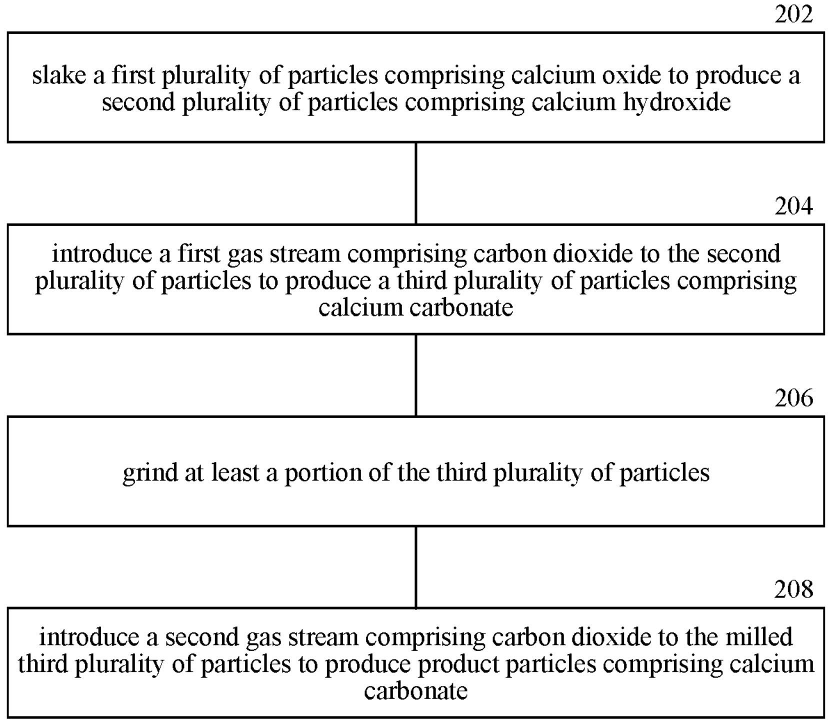

FIG. 2 is a flow diagram of a method 200 for producing calcium carbonate, in accordance with embodiments of the present disclosure. The method 200 includes slaking a first plurality of particles (e.g., the first plurality of particles 101; FIG. 1) comprising calcium oxide to produce a second plurality of particles (e.g., the second plurality of particles 103; FIG. 1) comprising calcium hydroxide (process portion 202). In some embodiments, the slaking is performed via a hydrator (e.g., the hydrator 102; FIG. 1). The second plurality of particles are particles in a solid-state that are either not contained in a slurry or aqueous solution, or are contained in a slurry having (i) less than 30% water or moisture (e.g., less than 25%, 20%, 15%, 10%, or any value or range of values between 10% and 30% water or moisture) or (ii) more than 70% solids content by weight (e.g., more than 75%, 80%, 85%, 90%, 95%, or any value or range of values between 70% to 95%).

The method 200 further includes introducing a first gas stream (e.g., the fluid 115*a*; FIG. 1) comprising carbon dioxide to the second plurality of particles to produce a third plurality of particles (e.g., the third plurality of particles 105; FIG. 1) comprising calcium carbonate (process portion 204). Introducing the first gas stream can include injecting the first gas stream into a conditioner (e.g., the conditioner 104) or other mixing area containing the second plurality of particles, such that the carbon dioxide of the first gas stream directly contacts the solid-state calcium hydroxide particles of the second plurality of particles. When the first gas stream is introduced, the second plurality of particles are either not contained in a slurry, or are contained in a slurry having (i) less than 30% water or moisture (e.g., less than 25%, 20%, 15%, 10%, or any value or range of values between 10% and 30% water or moisture) or (ii) more than 70% solids content by weight (e.g., more than 75%, 80%, 85%, 90%, 95%, or any value or range of values between 70% to 95%).

The method 200 further includes grinding at least a portion of the third plurality of particles (process portion 206). Grinding the third plurality of particles can occur in a grinder (e.g., the grinder 106; FIG. 1), and can break the third plurality of particles into smaller particles and expose additional surface area of the particles to carbon dioxide. In doing so, the conversion or production of calcium carbonate can be increased.

The method 200 further includes introducing a second gas stream (e.g., the fluid 115*b* or 115*c*) comprising carbon dioxide to the milled third plurality of particles (e.g., the fourth plurality of particles 107; FIG. 1) to produce product particles (e.g., the fifth plurality of particles 109 or the sixth plurality of particles 111; FIG. 1) comprising calcium carbonate (process portion 208). In some embodiments, the composition of the product particles can include at least about 90%, 95%, 96%, 97%, 98%, 99% or any value or range of values between 90% and 99%, calcium carbonate by weight. Additionally or alternatively, the produced calcium carbonate of the sixth plurality of particles can include a TAPPI brightness of 80, 85, 90, 91. 92, 93, 94, 95, 96, 97, 98, or 99, or a value or range of values between 80 and 99.

CONCLUSION

It will be apparent to those having skill in the art that changes may be made to the details of the above-described embodiments without departing from the underlying principles of the present disclosure. In some cases, well known structures and functions have not been shown or described in detail to avoid unnecessarily obscuring the description of the embodiments of the present technology. Although steps of methods may be presented herein in a particular order, alternative embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the disclosure and associated technology can encompass other embodiments not expressly shown or described herein, and the invention is not limited except as by the appended claims.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising," "including," and "having" should be interpreted to mean including at least the recited feature(s) such that any greater number of the same feature and/or additional types of other features are not precluded.

Reference herein to "one embodiment," "an embodiment," "some embodiments" or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

Unless otherwise indicated, all numbers expressing concentrations, compositions, specific surface areas, pore sizes, pore volumes, moisture content, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present technology. At the very least, and not as an attempt to limit the application of the doctrine of equivalents to the scope of the claims, each numerical parameter should at least be construed in light of the number of reported significant digits and by applying ordinary rounding techniques. Additionally, all ranges disclosed herein are to be understood to encompass any and all subranges subsumed therein. For example, a range of "1 to 10" includes any and all subranges between (and including) the minimum value of 1 and the maximum value of 10, i.e., any and all subranges having a minimum value of equal to or greater than 1 and a maximum value of equal to or less than 10, e.g., 5.5 to 10.

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

The present technology is illustrated, for example, according to various aspects described below. Various examples of aspects of the present technology are described as numbered clauses (1, 2, 3, etc.) for convenience. These clauses are provided as examples and do not limit the present technology. It is noted that any of the dependent clauses may be combined in any combination, and placed into a respective independent clause. The other clauses can be presented in a similar manner.

Clause 1: A method for producing calcium carbonate from calcium hydroxide and carbon dioxide, comprising: providing a first plurality of particles comprising solid-state calcium hydroxide; and introducing a gas stream comprising carbon dioxide to the first plurality of particles to produce a second plurality of particles comprising solid-state calcium carbonate.

Clause 2: The method of clause 1, wherein the first and second pluralities of particles are not part of a liquid slurry or aqueous solution comprising precipitated calcium carbonate.

Clause 3: The method of any one of the previous clauses, wherein providing the first plurality of particles comprises providing a slurry including the first plurality of particles, the slurry including no more than 20% liquid.

Clause 4: The method of any one of the previous clauses, wherein providing the first plurality of particles comprises providing a slurry including the first plurality of particles, the slurry including at least 80% solids content by weight.

Clause 5: The method of any one of the previous clauses, wherein the second plurality of particles comprising calcium carbonate is not produced via precipitation.

Clause 6: The method of any one of the previous clauses, wherein the second plurality of particles comprises at least 95% calcium carbonate.

Clause 7: The method of any one of the previous clauses, wherein: the first plurality of particles comprises at least 90% calcium hydroxide, providing the first plurality of particles comprises providing the first plurality of particles to a conditioner, and introducing the gas stream includes injecting the gas stream to the conditioner, thereby causing the carbon dioxide of the gas stream to directly contact the first plurality of particles.

Clause 8: The method of clause 7, further comprising exposing the gas stream to the first plurality of particles in the conditioner for a predetermined period of time of at least 10 minutes.

Clause 9: The method of any one of the previous clauses, wherein providing the first plurality of particles comprises slaking calcium oxide to produce the first plurality of particles, the method further comprising: after introducing the gas stream, milling at least a portion of the second plurality of particles; and after milling, drying at least a portion of the milled second plurality of particles.

Clause 10: The method of clause 9, wherein slaking comprises slaking the calcium oxide in the presence of at least one of glycol, diethylene glycol, triethylene glycol, monoethanolamine, diethanolamine, triethanolamine, sodium, or calcium lignosulfonate.

Clause 11: The method of any one of clauses 9 or 10, further comprising, prior to introducing the gas stream, filtering the first plurality of particles such that the filtered first plurality of particles has a $D_{90}/D_{10}$ ratio less than 6.

Clause 12: The method of any one of the previous clauses, wherein the gas stream is a first gas stream, the method further comprising: after introducing the first gas stream, grinding at least a portion of the second plurality of particles to produce a third plurality of particles comprising a first concentration of calcium carbonate; and after grinding, introducing a second gas stream comprising carbon dioxide to the third plurality of particles to produce a fourth plurality of particles comprising a second concentration of calcium carbonate greater than the first concentration of calcium carbonate.

Clause 13: The method of clause 12, further comprising, while grinding, introducing a third gas stream comprising carbon dioxide to the second plurality of particles.

Clause 14: The method of any one of the previous clauses, wherein the gas stream comprising carbon dioxide is (a) an off-gas stream, (b) a process gas stream, or (c) a combination of (a) and (b).

Clause 15: The method of any one of the previous clauses, wherein the carbon dioxide comprises at least about 40% of the gas stream.

Clause 16: The method of any one of the previous clauses, wherein the gas stream comprising carbon dioxide is received from a lime kiln.

Clause 17: The method of any one of the previous clauses, wherein individual ones of the first plurality of particles have a pore volume greater than or equal to about 0.15 $cm^3/g$.

Clause 18: The method of any one of the previous clauses, wherein individual ones of the first plurality of particles have an average pore diameter greater than or equal to about 200 Angstroms.

Clause 19: The method of any one of the previous clauses, wherein individual ones of the first plurality of particles have a surface area greater than or equal to 25 $m^2/g$.

Clause 20: The method of any one of the previous clauses, wherein individual ones of the first plurality of particles have a free moisture content of at least about 10%.

Clause 21: The method of any one of the previous clauses, wherein the first plurality of particles has an average $D_{90}$ of at least 3 microns.

Clause 22: The method of any one of the previous clauses, wherein the second plurality of particles has an average brightness greater than or equal to 90.

Clause 23: A system for producing calcium carbonate, comprising: a hydrator configured to add water to a first plurality of particles comprising calcium oxide to produce a second plurality of particles comprising solid-state calcium hydroxide particles; and a conditioner downstream of the hydrator and positioned to receive the second plurality of particles and a gas stream comprising carbon dioxide, the conditioner being configured to produce a third plurality of particles comprising solid-state calcium carbonate from the received second plurality of particles and gas stream.

Clause 24: The system of clause 23, further comprising a grinder downstream of the conditioner and positioned to receive the third plurality of particles, the grinder being configured to reduce the particle size of the third plurality of particles and thereby produce a fourth plurality of particles.

Clause 25: The system of clause 24, wherein the conditioner is a first conditioner and the gas stream is a first gas stream, the method further comprising: a second conditioner downstream of the grinder and positioned to receive the third plurality of particles and a second gas stream comprising carbon dioxide, the second conditioner being configured to produce a fourth plurality of particles comprising calcium carbonate from the received third plurality of particles and second gas stream.

Clause 26: The system of clause 25, further comprising a dryer downstream of the second conditioner and positioned to receive the fourth plurality of particles, the dryer being configured to reduce a free moisture content of the fourth plurality of particles.

Clause 27: The system of any one of the previous clauses, further comprising a dryer downstream of the grinder and positioned to receive the fourth plurality of particles, the dryer being configured to reduce a free moisture content of the third plurality of particles.

Clause 28: The system of any one of the previous clauses, wherein the third plurality of particles comprising calcium carbonate particles are not produced via precipitation.

Clause 29: The system of any one of the previous clauses, wherein the second plurality of particles is part of a slurry comprising no more than 20% liquid by weight.

Clause 30: The system of any one of the previous clauses, wherein the second plurality of particles is part of a slurry comprising at least 80% solids content by weight.

Clause 31: The system of any one of the previous clauses, wherein individual ones of the second plurality of particles have a pore volume greater than or equal to about 0.15 $cm^3/g$.

Clause 32: The system of any one of the previous clauses, wherein individual ones of the second plurality of particles have an average pore diameter greater than or equal to about 200 Angstroms.

Clause 33: The system of any one of the previous clauses, wherein individual ones of the second plurality of particles have a surface area greater than or equal to 25 $m^2/g$.

Clause 34: The system of any one of the previous clauses, wherein individual ones of the second plurality of particles have a free moisture content of at least about 10%.

Clause 35: The system of any one of the previous clauses, wherein the second plurality of particles has an average $D_{90}$ of at least 3 microns.

Clause 36: The system of any one of the previous clauses, wherein the third plurality of particles has a brightness greater than or equal to 95.

Clause 37: The system of any one of the previous clauses, wherein the second plurality of particles is exposed to the gas stream in the conditioner for a period of time of at least 15 minutes.

Clause 38: A method for producing calcium carbonate without precipitation, comprising: slaking a first plurality of particles to produce a second plurality of particles comprising calcium hydroxide, wherein individual ones of the second plurality of particles include a surface area of at least about 20 $m^2/g$ and a moisture content of from about 2% to 20%; introducing a gas stream comprising carbon dioxide to the second plurality of particles to produce a third plurality of particles comprising calcium carbonate and calcium hydroxide; and milling at least a portion of the third plurality of particles to produce a fourth plurality of particles.

Clause 39: The method of any one of the previous clauses, wherein the gas stream is a first gas stream, the method further comprising introducing a second gas stream comprising carbon dioxide to the fourth plurality of particles to produce a fifth plurality of particles comprising calcium carbonate, the fifth plurality of particles having a higher concentration of calcium carbonate than that of the fourth plurality of particles.

Clause 40: The method of any one of the previous clauses, wherein the gas stream is a first gas stream, the method further comprising introducing a second gas stream comprising carbon dioxide to the third plurality of particles while the third plurality of particles is being milled.

Clause 41: The method of any one of the previous clauses, wherein the second plurality of particles comprise: an average pore volume of at least about 0.15 $cm^3/g$; an average pore diameter of at least about 200 angstroms; and an average $D_{90}$ no greater than about 4 microns.

Clause 42: The method of any one of the previous clauses, wherein the second plurality of particles comprise a steepness of no greater than about 5.

We claim:

1. A system for producing calcium carbonate, comprising: a hydrator comprising a source of water and a source of a first plurality of particles comprising calcium oxide to produce a second plurality of particles comprising solid-state calcium hydroxide particles, individual ones of the calcium hydroxide particles including (i) a specific surface area of at least 20 $m^2/g$ and (ii) a free moisture content of from 2% to 20%, wherein the second plurality of particle is part of a slurry at least 80% solid content by weight; and a conditioner downstream of the hydrator and positioned to receive the second plurality of particles, wherein the conditioner comprising a source of a gas stream comprising at least 30% by weight carbon dioxide, the conditioner being configured to produce a third plurality of particles comprising solid-state calcium carbonate from the received second plurality of particles and the gas stream.

2. The system of claim 1, further comprising a grinder downstream of the conditioner and positioned to receive the third plurality of particles, the grinder being configured to reduce the particle size of the third plurality of particles and thereby produce a fourth plurality of particles.

3. The system of claim 2, wherein the conditioner is a first conditioner and the gas stream is a first gas stream, the system further comprising:

a second conditioner downstream of the grinder and positioned to receive the third plurality of particles and a second gas stream comprising carbon dioxide, the second conditioner being configured to produce a fourth plurality of particles comprising calcium carbonate from the received third plurality of particles and second gas stream.

4. The system of claim 1, wherein the third plurality of particles comprising calcium carbonate particles is not produced via precipitation.

5. A system for producing calcium carbonate, comprising: a hydrator comprising a source of water and a source of a first plurality of particles comprising calcium oxide to produce a second plurality of particles comprising solid-state calcium hydroxide particles, individual ones of the calcium hydroxide particles including (i) a specific surface area of at least 20 $m^2/g$ and (ii) a free moisture content of from 2% to 20%, wherein the second plurality of particles is part of a slurry comprising no more than 20% liquid weight; and wherein the second plurality of particle is part of a slurry at least 80% solid content by weight; and a conditioner downstream of the hydrator and positioned to receive the second plurality of particles, wherein the conditioner comprising a source of a gas stream comprising at least 30% by weight carbon dioxide, the conditioner being configured to produce a third plurality of particles comprising solid-state calcium carbonate from the received second plurality of particles and the gas stream.

6. The system of claim 1, wherein individual ones of the second plurality of particles comprise at least one of:

a pore volume greater than or equal to about 0.15 cm3/g;

an average pore diameter greater than or equal to about 200 Angstroms; or a surface area greater than or equal to 25 m2/g; or a free moisture content of at least about 10%.

7. The system of claim 1, further comprising:

a grinder downstream of the conditioner and configured to receive the third plurality of particles to produce a fourth plurality of particles;

a second conditioner downstream of the grinder and configured to receive the fourth plurality of particles and produce a fifth plurality of particles; and a dryer downstream of the second conditioner and configured to receive the fifth plurality of particles and produce a sixth plurality of particles, wherein the sixth plurality of particles has a TAPPI brightness greater than or equal to 95.

8. The system of claim 1, wherein the second plurality of particles is exposed to the gas stream in the conditioner for a period of time of at least 15 minutes.

9. A system for producing calcium carbonate, comprising: a hydrator comprising a source of water and a source of a first plurality of particles comprising calcium oxide to produce a second plurality of particles comprising solid-state calcium hydroxide particles, individual ones of the calcium hydroxide particles including a specific surface area of at least 20 $m^2/g$; and a conditioner downstream of the hydrator and positioned to receive the second plurality of particles, wherein the conditioner comprising a source of a gas stream comprising at least 30% by weight carbon dioxide and configured to directly contact the second plurality of particles to produce a third plurality of particles comprising solid-state calcium carbonate wherein the gas stream is provided via a lime kiln.

10. The system of claim 9, wherein the third plurality of particles comprises at least 40% by weight solid-state calcium carbonate.

11. The system of claim 9, further comprising a grinder downstream of the conditioner and positioned to receive the third plurality of particles, the grinder being configured to reduce the particle size of the third plurality of particles and thereby produce a fourth plurality of particles.

12. The system of claim 11, wherein the conditioner is a first conditioner and the gas stream is a first gas stream, the system further comprising:

a second conditioner downstream of the grinder and positioned to receive the third plurality of particles and a second gas stream comprising carbon dioxide, the second conditioner being configured to produce a fourth plurality of particles comprising calcium carbonate from the received third plurality of particles and second gas stream.

13. The system of claim 9, wherein the third plurality of particles comprising calcium carbonate particles are not produced via precipitation.

14. The system of claim 9, wherein the third plurality of particles is not part of a liquid slurry comprising precipitated calcium carbonate.

15. The system of claim 9, wherein the second plurality of particles comprise a specific surface area of at least 30 m2/g.

16. The system of claim 9, wherein individual ones of the second plurality of particles have a free moisture content of from 2% to 20% by weight.

17. The system of claim 9, further comprising:

a grinder downstream of the conditioner and configured to receive the third plurality of particles to produce a fourth plurality of particles;

a second conditioner downstream of the grinder and configured to receive the fourth plurality of particles and produce a fifth plurality of particles; and a dryer downstream of the second conditioner and configured to receive the fifth plurality of particles and produce a sixth plurality of particles, wherein the sixth plurality of particles has a TAPPI brightness greater than or equal to 95.

18. The system of claim 9, wherein the second plurality of particles is part of a slurry comprising no more than 20% liquid by weight.

19. The system of claim 9, wherein the second plurality of particles is part of a slurry comprising at least 80% solids content by weight.

* * * * *